April 15, 1930.  J. R. SNYDER  1,754,488
SHOCK ABSORBER
Original Filed Aug. 9, 1924
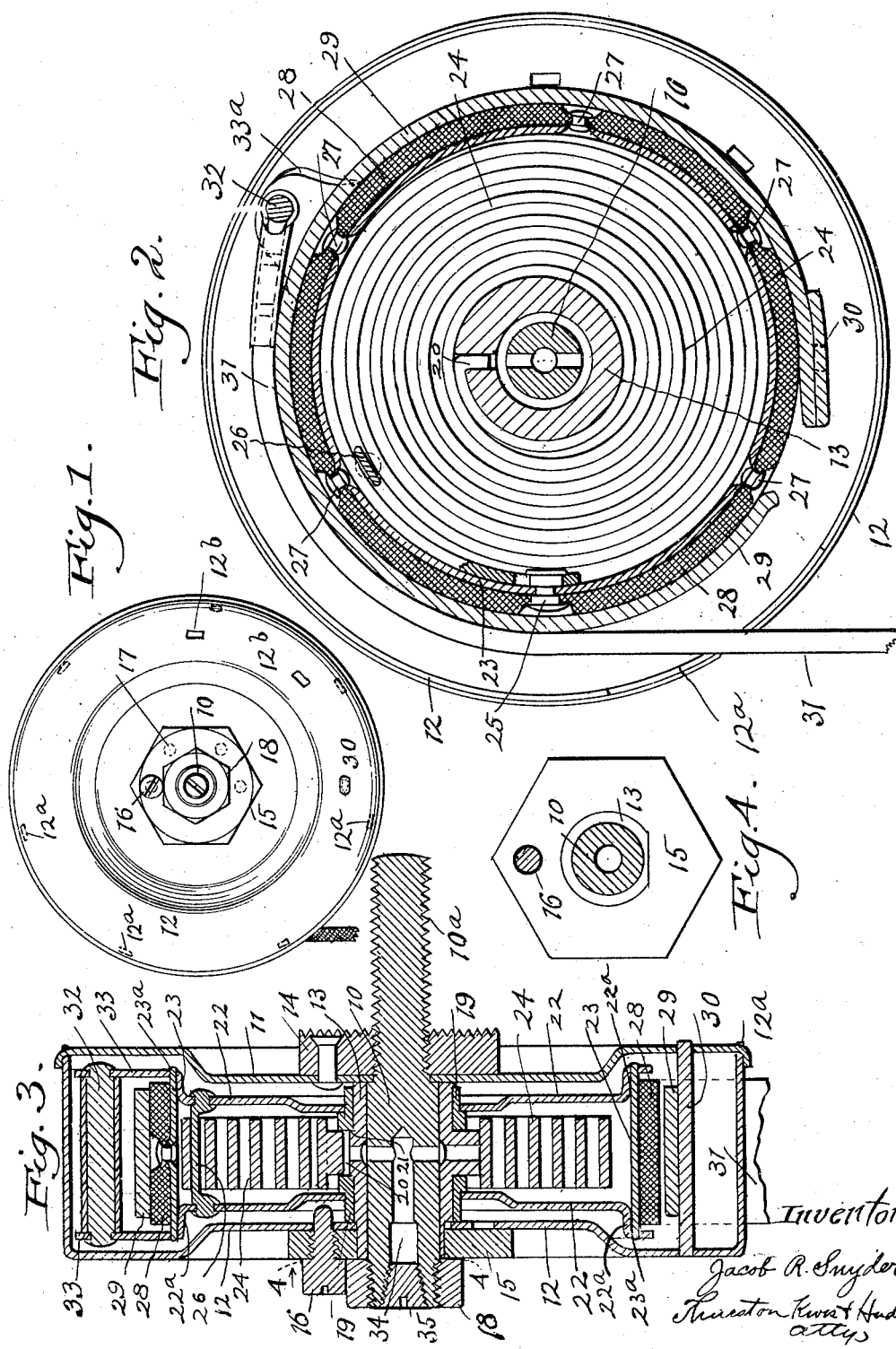

Patented Apr. 15, 1930

1,754,488

UNITED STATES PATENT OFFICE

JACOB R. SNYDER, OF CLEVELAND, OHIO

SHOCK ABSORBER

Application filed August 9, 1924, Serial No. 731,017. Renewed September 12, 1929.

This invention relates to improvements in shock absorbers adapted particularly for use on motor vehicles to check the rebound movement of the main springs.

The main object of the invention is to provide a novel and efficient construction of a shock absorber of the frictionally retarded type.

The present shock absorber embodies certain structural modifications of but has the same principle of operation as the shock absorber constituting the subject matter of a companion application, Serial No. 731,016, filed of even date herewith. The shock absorber of the companion application has a suitably supported rotary member to which is connected a strap designed to be wound onto said member by a spring during the compression stroke of the main springs of the vehicle and to be unwound therefrom during the rebound stroke. The annular member is frictionally retarded so as to check the rebound movement in a novel and effective manner through the provision of a stationary friction member arranged between the strap and the rotary member, this friction member substantially enveloping the rotary member and having one end fixed and the other end free to come and go, the arrangement being such that during the compression stroke of the main springs, or when the rotary member is rotated to wind in the strap, the friction member is relatively free or loose on the periphery of the rotary member so as to offer practically no resistance to its rotation, but on the rebound stroke the pull on the strap causes the friction member to grip the periphery of the rotary member, and during this part of the cycle the rotation of said member is frictionally resisted by the friction of the rotary member turning within the friction member, and by the friction of the strap sliding over the outer surface of the friction member.

By the present invention the same results are obtained with a different construction, the preferred embodiment being illustrated in the accompanying sheet of drawings wherein Fig. 1 is a side elevation of the shock absorber looking toward the right of Fig. 3; Fig. 2 is a sectional view with the section at right angles to the axis of the shock absorber; Fig. 3 is a section substantially at right angles to the section of Fig. 2; and Fig. 4 is a detail sectional view substantially along the line 4—4 of Fig. 3.

Referring now to the drawings, 10 represents the so-called center bolt which is normally stationary and by which the shock absorber may be secured to the chassis frame of a motor vehicle by a fitting (not shown) adapted to be applied to the threaded end 10ª of the center bolt. This center bolt extends through a stationary casing composed of two parts 11 and 12, both being in the form of metal stampings, the part 11 being in the form of a disk which extends out to the periphery of the casing, and the part 12 forming one side and the periphery. These two parts may be fitted together by extending lugs 12ª, provided at intervals along one edge of the part 12 through suitably positioned openings near the outer edge of the disk 11. On the center bolt is a collar 13 forming a support for the inner end of a spring, to be referred to, the disk 11 being clamped against the shoulder of the center bolt and against one end of this collar by a nut 14 which is screwed onto the threaded end 10ª of the center bolt, and to which the disk 11 may be secured, as by riveting. The collar 13 extends out through the opposite side of the casing, and on the extension is a hexagonal member 15, which can be turned when desired, to adjust the tension of the spring of the shock absorber, as will be subsequently explained. This member and the collar are normally held from rotating by a screw 16, extending through member 15 and through an opening in the part 12 of the casing, a series of which openings are provided as indicated at 17 of Fig. 1, to provide for this adjustment. A nut 18 is screwed onto the left hand end of the center bolt as the same is viewed in Fig. 3, and this nut holds all parts in assembled relationship by bearing against the end of the extension of the collar 13 and against the member 15. The screw 16 serves as a locknut to hold the nut 18 from turning.

The collar 13 is provided with two bushings 19 of bronze or other good wear resisting material, these bushings being fitted onto the collar and forming extended bearings for the drum to be referred to. These bushings are spaced apart axially and bear against shoulders 21 of the collar, as shown in Fig. 3, these shoulders constituting the sides of a spiral shaped flange-like portion of the center bolt, the same constituting a support for the inner convolution of the shock absorber spring.

Rotatable with the bushings 19 on the collar 13 is a drum, preferably formed of metal in one, two or three parts, as may be found desirable. Preferably it is formed in three parts consisting of two side disks 22, and a peripheral portion consisting preferably of a band 23 which may be formed from a metal strip bent into circular shape and with its ends welded or otherwise secured together. As here illustrated, this band is seated upon outwardly extending shoulders 22ª of the disks 22, and the three parts may be fastened together by providing lugs 23ª on the edges of the band, and by extending these lugs through openings of the disks 22, just beyond the shoulders 22ª, and by upsetting these lugs.

Inside the drum and located between the side portions 22 thereof, is the shock absorber spring 24 in spiral form, and produced from flat stock, as illustrated. The inner end of this spring is fastened to the collar 13 as by extending the extreme inner end into an opening in the spiral flange-like portion of the collar, the inner convolution of the spring resting upon this portion as illustrated in Fig. 2, so that bending of the spring and crystallization will be avoided at this point. The outer end of the spring is fastened to the band 23 of the drum in any suitable way, as by a rivet 25. I prefer to support the outer convolution near the point where the spring is attached to the drum by a bridge 26 consisting of a member extending between the side disks 22 of the drum, as clearly illustrated in Fig. 3. This spring-supporting bridge keeps the body of the spring substantially concentric with the center bolt and minimizes bending of the spring near the point where it is attached to the drum as the spring is wound up and unwound.

Attached to the periphery or band 23 of the drum, as by means of rivets 27, is a strip 28 of brake lining or other suitable frictional material, and surrounding this material is a stationary friction member 29 which substantially, but not entirely envelops the drum, as shown in Fig. 2. One end of this friction member is held stationary, as by attaching to the end thereof, a piece 30 provided at its ends with lugs extending through openings in the sides of the stationary casing. The other end of the friction member is free to come and go, and preferably this member is formed of steel or other material having a certain degree of spring or elasticity, so that it will have an inherent tendency to open up and become free, or substantially free of the periphery of the drum, but the construction is such that it may be pulled down into frictional engagement with the friction surface of the drum.

Outside of the friction member 29 and adapted to slide thereover, is a strap 31 of the shock absorber, the inner end of the strap being secured to the drum, and its outer end being designed to be secured in the customary manner to the axle of the vehicle. The strap is in this instance connected to a pin 32 (see Figs. 2 and 3) extending between ears 33 which at one point extend outwardly from the side members of the drum. This strap should extend from the pin 32 in the same direction that the friction member 29 extends around the drum from its fixed end and to prevent the strap being applied to the drum and extended in the wrong direction from the pin 32 the ears may be bent inwardly on one side of the pin, as indicated at 33ª in Fig. 2.

It will be seen therefore, that with this construction, during the compression stroke of the main springs, the spring 24 will wind in the strap, but during this portion of the cycle of operations there is practially no pull on the strap 31, in consequence of which the strap slides freely over the friction member, and the drum is turned freely inside the friction member, the latter then being open, but during the rebound stroke, when the strap is pulled out or unwound, the pull on the strap causes the friction member to grip the friction material on the periphery of the drum, and it slides over the friction member 29 producing a frictional retarding action, and at the same time the rebound movement is frictionally retarded by the frictional engagement of the friction material 28 with the inner surface of the friction member 29. Additionally the spring 24 is wound up during the rebound stroke, and the gradually increased tension imposed in the spring also offers resistance to the rebound movements of the main springs.

Thus it will be seen that with this construction the rebound movement is retarded by frictionally retarding the rotation of the drum, and by frictionally retarding the movement of the strap on the friction member 29. During the rebound movement a definite part of the friction member, in this instance about 270° thereof, is held by the strap against the friction surface of the drum throughout the rebound movement, but during this period the length of the strap engaging the friction member is greatest at the beginning of the rebound movement and gradually decreases as the strap unwinds.

As stated above, during the opposite rotation of the drum, i. e. during the compression stroke of the main springs, the rotation of the drum by the spring 24 is practically unretarded. The friction member 29 opens up so as to allow the drum to rotate freely, or practically freely thereon, and the strap then slides freely over the friction member.

If it is desired to vary the tension of the spring 24, this is done by removing the screw 16 and by a suitable tool turning member 15 and collar 13, and then restoring the screw to some other opening 17. If it is desired to vary the length of strap which is wrapped around the drum in the normal position of the drum, this can be readily done by turning the shock absorber as a whole relative to the fitting on the center bolt, this fitting being designed to engage the nut 14. As the strap 31 extends out through a peripheral opening 12$^a$ in the part 12 of the casing, the adjustment above referred to may necessitate a repositioning of the opening 12$^a$, so that the belt will run freely into and out of the casing. This can be done by adjusting the part 12 of the casing relative to the part 11. To do this, the screw 16 is removed, the nut 18 is backed away, the two parts of the casing are disengaged where they normally engage, the part 12 is then turned in the proper direction relative to the part 11 and the parts re-engaged and reclamped together as previously. A series of openings 12$^b$ is provided in the part 11 of the casing to accommodate one end of the member 30, a plurality of these openings being provided to permit the relative adjustment of the parts of the casing.

Lubricant is adapted to be supplied to the interior of the casing occupied by spring 24, so as to keep the convolutions of the spring lubricated and cause the spring to be silent in action. This lubricant can be supplied through an opening 34 of the center bolt, the outer end of the opening being normally closed by a plug 35, and the inner end communicating with openings extending through the collar 13.

I do not desire to be confined to the precise details shown, but aim in my claims to cover all modifications which do not involve a departure from the spirit and scope of my invention as set forth in the appended claims. For example, the friction material might be applied to the inner surface of the metal friction member instead of to the periphery of the drum.

Having described my invention, I claim:

1. In a shock absorber, a rotatable friction member having a strap connected thereto so as to be wound onto and unwound therefrom, and a stationary expansible and contractible friction member between the strap and the rotatable member, one of said last mentioned parts being faced with friction material.

2. In a shock absorber, a rotatable drum, a stationary expansible and contractible friction member extending about the drum and adapted to grip the drum and to be released therefrom, friction material being interposed between the surfaces of said parts, and a strap connected to the drum and adapted to engage said friction member.

3. In a shock absorber, a stationary center member, a drum rotatably supported thereon, a friction member engageable with the drum and extending about the drum and having one end fixed and its other end free, and a strap connected to the drum and adapted to slide over said friction member as the drum is rotated.

4. In a shock absorber, a rotatable drum having a metal peripheral portion, a metal friction member extending about the drum and having one end fixed, frictional material secured to one of said parts and arranged between the engageable surfaces thereof, and a strap connected to the drum and adapted to press the friction member against the drum.

5. In a shock absorber, a stationary center member, a hollow friction drum rotatably mounted thereon, a spring connected to the drum for rotating the same in one direction, a strap connected to the drum for rotating the same in the opposite direction, and a stationary friction member enveloping the drum so that it may frictionally engage the same and arranged between the latter and the strap.

6. In a shock absorber, a stationary center member, a hollow drum rotatably mounted thereon, a spring connected to the drum for rotating the same in one direction, a strap connected to the drum for rotating the same in the opposite direction, and a stationary friction member enveloping the drum and arranged between the latter and the strap, said member being adapted to alternately frictionally grip and release the drum depending upon the direction in which the drum is rotated.

7. In a shock absorber, a drum and a friction material secured to the surface thereof, a metal band enveloping substantially the entire periphery of the drum and adapted to grip the friction material and to be released therefrom, and a strap connected to the drum and adapted to be wound onto and unwound therefrom and serving to press the friction member against the drum when the strap is unwound from the latter.

8. In a shock absorber, a member rotatable in opposite directions, a strap adapted to be wound about the same and to be unwound therefrom, and an expansible and contractible friction member with respect to which said rotary member rotates in both directions, and which is effective to frictionally engage and resist the rotation of said rotary member in one direction only, friction material being interposed between said friction member and the rotary member.

9. In a shock absorber, a rotary member, a strap connected thereto and adapted to be wound about the same and to be unwound therefrom as said member rotates in opposite directions, and an expansible and contractible friction member which is caused by the strap to frictionally engage the rotary member when the strap is unwound from the latter, there being friction material interposed between said friction member and the rotary member.

In testimony whereof, I hereunto affix my signature.

JACOB R. SNYDER.